United States Patent
Kang et al.

(10) Patent No.: US 7,145,258 B2
(45) Date of Patent: Dec. 5, 2006

(54) ELECTRICITY GENERATING AND AIR CONDITIONING SYSTEM

(75) Inventors: Seung Tak Kang, Seoul (KR); Chang Min Choi, Seoul-si (KR); Won Jae Choi, Seoul (KR); Hyung Soo Lim, Seoul (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/037,071

(22) Filed: Jan. 19, 2005

(65) Prior Publication Data

US 2006/0037341 A1    Feb. 23, 2006

(30) Foreign Application Priority Data

Aug. 17, 2004  (KR) .................. 10-2004-0064813

(51) Int. Cl.
  *F25B 27/00*  (2006.01)
(52) U.S. Cl. ..................................................... 290/2
(58) Field of Classification Search .............. None
  See application file for complete search history.

(56) References Cited

U.S. PATENT DOCUMENTS

| | | | | |
|---|---|---|---|---|
| 2,313,439 A | * | 3/1943 | Horton ...................... 165/251 |
| 2,355,040 A | * | 8/1944 | Alexander et al. .......... 165/256 |
| 3,078,689 A | * | 2/1963 | Japhet ....................... 62/324.3 |
| 3,139,924 A | * | 7/1964 | Schreiner ..................... 62/160 |
| 3,424,916 A | * | 1/1969 | Fenley ...................... 290/40 R |
| 4,384,673 A | * | 5/1983 | Carson ...................... 237/12.1 |
| 4,531,379 A | * | 7/1985 | Diefenthaler, Jr. ........... 62/236 |
| 4,907,738 A | * | 3/1990 | Harris ........................ 237/2 B |
| 5,003,788 A | * | 4/1991 | Fischer ..................... 62/238.7 |
| 5,020,320 A | * | 6/1991 | Talbert et al. ............. 62/238.7 |
| 5,429,179 A | * | 7/1995 | Klausing .................... 165/240 |
| 5,473,910 A | * | 12/1995 | Atterbury et al. .......... 62/323.1 |
| 6,913,068 B1 | * | 7/2005 | Togawa et al. ............... 165/51 |
| 6,966,185 B1 | * | 11/2005 | Shimada et al. .............. 60/698 |

FOREIGN PATENT DOCUMENTS

JP  2003-35467 A  2/2003

* cited by examiner

*Primary Examiner*—Joseph Waks
(74) *Attorney, Agent, or Firm*—Birch, Stewart, Kolasch & Birch, LLP (57) ABSTRACT

An electricity generating and air conditioning system including an engine, a generator connected to an output shaft of the engine to generate electricity, an air conditioner, which uses the electricity generated from the generator and includes a compressor, an indoor heat exchanger, an outdoor heat exchanger, and an expansion device, and an exhaust gas waste heat recovering device to recover heat of exhaust gas discharged from the engine and to transfer the recovered heat to a refrigerant passing through a discharge line of the compressor. The electricity generating and air conditioning system has an advantage in that an enhancement in heating performance is achieved.

22 Claims, 8 Drawing Sheets

ELECTRICITY GENERATING AND AIR CONDITIONING SYSTEM

BACKGROUND OF THE INVENTION

1. Field of the Invention

The present invention relates to an electricity generating and air conditioning system, and, more particularly, to an electricity generating and air conditioning system in which exhaust gas or cooling water of an engine is used to achieve an improvement in air conditioning efficiency.

2. Description of the Related Art

In general, electricity generating and air conditioning systems generate electricity by use of a rotating force outputted from an engine, and operate an air conditioner by use of the generated electricity. Such electricity generating and air conditioning systems are mainly used for multi-type air conditioners or large-scale air conditioners.

Such electricity generating and air conditioning systems include an engine, a generator connected to an output shaft of the engine to generate electricity, and an air conditioner, which is operated, using the electricity generated from the generator.

However, such a conventional electricity generating and air conditioning system has a problem in that waste heat of exhaust gas discharged from an engine and waste heat of cooling water used to cool the engine are inefficiently re-used, so that the system exhibits a low energy efficiency.

SUMMARY OF THE INVENTION

The present invention has been made in view of the above-mentioned problems, and it is an object of the invention to provide an electricity generating and air conditioning system in which heat of exhaust gas discharged from an engine is used to heat refrigerant introduced into an indoor heat exchanger, so that the system exhibits an enhanced heating performance.

Another object of the invention is to provide an electricity generating and air conditioning system in which cooling water used to cool an engine is used to prevent an outdoor heat exchanger from being frosted, so that the system exhibits an enhanced heating performance.

Another object of the invention is to provide an electricity generating and air conditioning system in which exhaust gas discharged from an engine is used to prevent an outdoor heat exchanger from being frosted, so that the system exhibits an enhanced heating performance.

In accordance with one aspect, the present invention provides an electricity generating and air conditioning system comprising: an engine; a generator connected to an output shaft of the engine to generate electricity; an air conditioner, which uses the electricity generated from the generator and includes a compressor, an indoor heat exchanger, an outdoor heat exchanger, and an expansion device; and exhaust gas waste heat recovering means to recover heat of exhaust gas discharged from the engine and to transfer the recovered heat to a refrigerant passing through a discharge line of the compressor.

The exhaust gas may be discharged toward the outdoor heat exchanger after releasing heat into the exhaust gas waste heat recovering means.

The electricity generating and air conditioning system may further comprise cooling water waste heat recovering means to recover heat of cooling water used to cool the engine and to pre-heat air blown to the outdoor heat exchanger, using the recovered heat.

In accordance with another aspect, the present invention provides an electricity generating and air conditioning system comprising: an engine; a generator connected to an output shaft of the engine to generate electricity; an air conditioner, which uses the electricity generated from the generator and includes a compressor, an indoor heat exchanger, an outdoor heat exchanger, and an expansion device; and cooling water waste heat recovering means to recover heat of cooling water used to cool the engine and to pre-heat air blown to the outdoor heat exchanger, using the recovered heat.

The exhaust gas generated from the engine may be discharged toward the outdoor heat exchanger.

In accordance with another aspect, the present invention provides an electricity generating and air conditioning system comprising: an engine; a generator connected to an output shaft of the engine to generate electricity; and an air conditioner, which uses the electricity generated from the generator and includes a compressor, an indoor heat exchanger, an outdoor heat exchanger, and an expansion device, wherein the exhaust gas generated from the engine is discharged toward the outdoor heat exchanger.

In accordance with another aspect, the present invention provides an electricity generating and air conditioning system comprising: an engine; a generator connected to an output shaft of the engine to generate electricity; an air conditioner, which uses the electricity generated from the generator and includes a compressor, an indoor heat exchanger, an outdoor heat exchanger, and an expansion device; an exhaust gas waste heat recovering heat exchanger to recover heat of exhaust gas discharged from the engine; a compressor discharge line heater to heat a refrigerant passing through a discharge line of the compressor, using the heat recovered by the exhaust gas waste heat recovering heat exchanger; a cooling water waste heat recovering heat exchanger to recover heat of cooling water used to cool the engine; a pre-heater to pre-heat air blown to the outdoor heat exchanger, using the heat recovered by the cooling water waste heat recovering heat exchanger; and guide means to guide exhaust gas, which has released heat into the exhaust gas waste heat recovering heat exchanger, to be fed to the pre-heater after being mixed with outdoor air.

The guide means may comprise an outdoor blower to blow the exhaust gas, which has released heat to the exhaust gas waste heat recovering heat exchanger, and the outdoor air to the pre-heater, and a guide to guide the exhaust gas, which has released heat to the exhaust gas waste heat recovering heat exchanger, and the outdoor air to the pre-heater.

The electricity generating and air conditioning system may further comprise purifying means to purify the exhaust gas, which has released heat to the exhaust gas waste heat recovering heat exchanger.

The air conditioner may be a heat pump type air conditioner.

At least one of the engine, the generator, the outdoor heat exchanger, and the indoor heat exchanger may comprise a plurality of ones.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of an electricity generating and air conditioning system according to the present invention will be described with reference to the annexed drawings.

Figure 1:
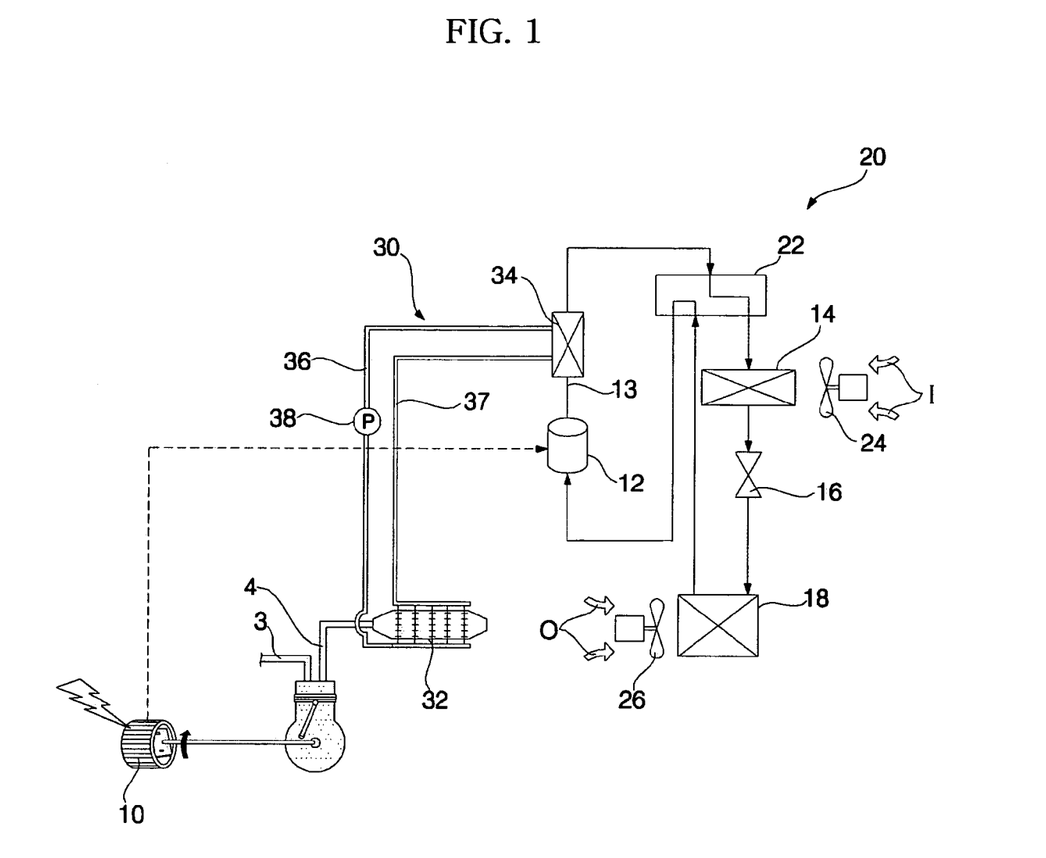
FIG. 1 is a schematic diagram of an electricity generating and air conditioning system according to a first embodiment of the present invention, illustrating a state in which the system operates in a heating mode.
Figure 2:
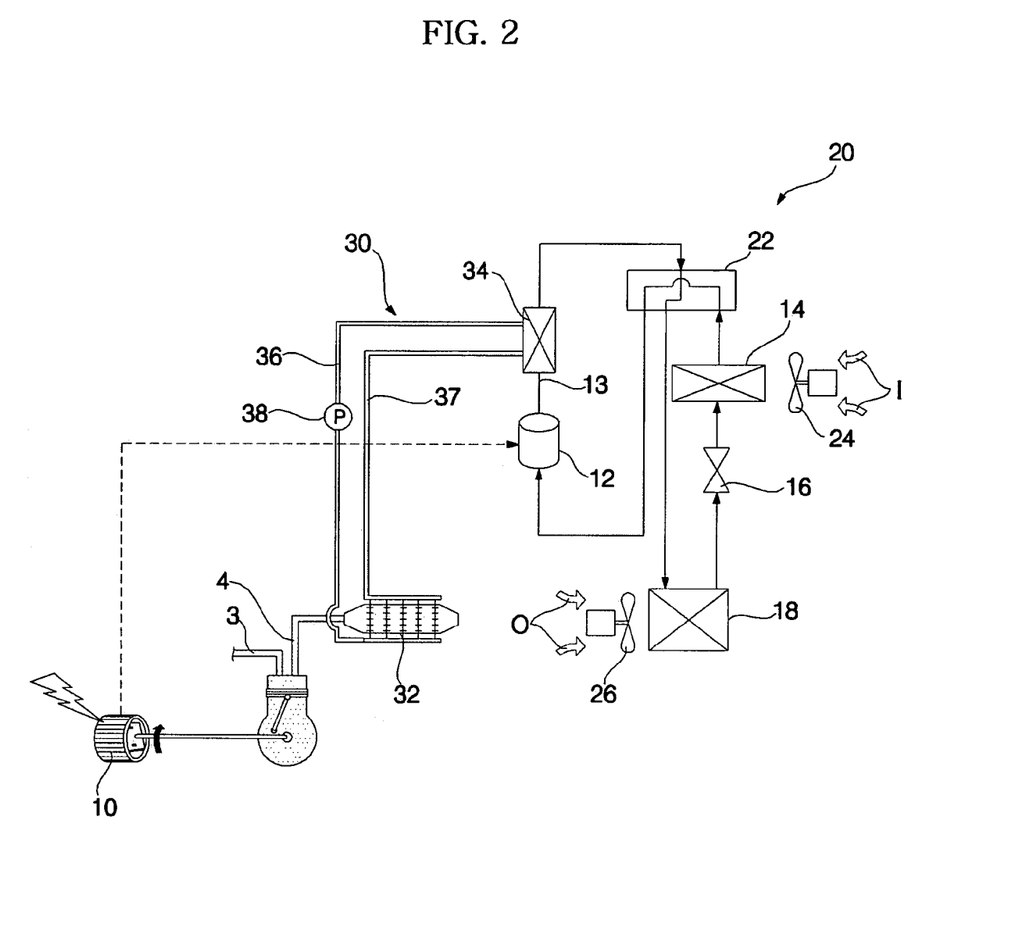
FIG. 2 is a schematic diagram of the electricity generating and air conditioning system according to the first embodiment of the present invention, illustrating a state in which the system operates in a cooling mode.

FIG. 1 is a schematic diagram of an electricity generating and air conditioning system according to a first embodiment of the present invention, illustrating a state in which the system operates in a heating mode. FIG. 2 is a schematic diagram of the electricity generating and air conditioning system according to the first embodiment of the present invention, illustrating a state in which the system operates in a cooling mode.

As shown in FIGS. 1 and 2, the electricity generating and air conditioning system includes an engine 2, a generator 10 connected to an output shaft of the engine 2 to generate electricity, and an air conditioner 20, which uses the electricity generated from the generator 10 and includes a compressor 12, an indoor heat exchanger 14, an expansion device 16, and an outdoor heat exchanger 18. The electricity generating and air conditioning system also includes an exhaust gas waste heat recovering means 30 to recover heat of exhaust gas discharged from the engine 2 and to transfer the recovered heat to a refrigerant passing through a discharge line 13 of the compressor 12.

The engine 2 includes a combustion chamber defined in the interior of the engine 2.

A fuel tube 3 and an exhaust tube 4 are connected to the engine 2. The fuel tube 3 is adapted to supply fuel such as liquefied gas or liquefied petroleum gas into the combustion chamber. The exhaust tube 4 is adapted to guide exhaust gas discharged from the combustion chamber.

The generator 10 may be an AC generator or a DC generator.

The air conditioner 20 may be an air conditioner used only for heating purposes. Alternatively, the air conditioner 20 may be a heat pump type air conditioner, which is switchable between a heating mode and a cooling mode. The following description will be given only in conjunction with the case in which the air conditioner 20 is a heat pump type air conditioner.

The air conditioner 20 further includes a directional valve 22 to switch the circulation direction of refrigerant between a cooling mode and a heating mode.

That is, in a heating operation of the air conditioner 20, refrigerant, which has been compressed in the compressor 12, flows through the directional valve 22, indoor heat exchanger 14, expansion device 16, outdoor heat exchanger 18, and directional valve 22, in this order, and then enters the compressor 12, as shown in FIG. 1. Thus, the refrigerant is circulated. In this operation, the outdoor heat exchanger 18 functions as an evaporator, whereas the indoor heat exchanger 14 functions as a condenser, and thus, discharges heat to indoor air.

On the other hand, in a cooling operation of the air conditioner 20, refrigerant, which has been compressed in the compressor 12, flows through the directional valve 22, outdoor heat exchanger 18, expansion device 16, indoor heat exchanger 14, and directional valve 22, in this order, and then enters the compressor 12, as shown in FIG. 2. Thus, the refrigerant is circulated. In this operation, the outdoor heat exchanger 18 functions as a condenser, whereas the indoor heat exchanger 14 functions as an evaporator, and thus, absorbs heat from indoor air.

The exhaust gas waste heat recovering means 30 includes an exhaust gas waste heat recovering heat exchanger 32 to recover heat of exhaust gas discharged from the engine 2, and a compressor discharge line heater 34 to heat a refrigerants passing through the discharge line 13 of the compressor 12, using the heat recovered by the exhaust gas waste heat recovering heat exchanger 32.

The exhaust gas waste heat recovering means 30 also includes circulation conduits 36 and 37, which connect the exhaust gas waste heat recovering heat exchanger 32 and the compressor discharge line heater 34 to guide a heat medium emerging from the exhaust gas waste heat recovering heat exchanger 32 such that the heat medium is circulated into the exhaust waste heat recovering heat exchanger 32 after absorbing heat from the exhaust gas in the exhaust gas waste heat recovering heat exchanger 32 and subsequently heating the refrigerant in the compressor discharge line heater 34.

The exhaust gas waste heat recovering means 30 further includes a heat medium circulation pump 38 directly connected to one of the circulation conduits 36 and 37 for the circulation of the heat medium.

Reference numeral 24 designates an indoor fan to blow indoor air I to the indoor heat exchanger 14, and reference numeral 26 designates an outdoor fan to blow outdoor air O to the outdoor heat exchanger 18.

Hereinafter, operation of the electricity generating and air conditioning system having the above-described arrangement will be described.

When fuel is supplied into the engine 2 via the fuel tube 3, and the engine 2 is subsequently driven, the output shaft of the engine 2 is rotated, thereby causing the generator 10 to generate electricity.

In a heating operation of the air conditioner 20, the heat medium circulation pump 38 is driven, and the directional valve 22 is switched to a heating mode. The compressor 12 is also driven, using the electricity generated from the generator 10.

When the heat medium circulation pump 38 operates, exhaust gas, which is discharged from the engine 2, releases heat while passing through the exhaust gas waste heat recovering heat exchanger 32, and is then discharged to the atmosphere.

During the operation of the heat medium circulation pump 38, the heat medium is fed to the compressor discharge line heater 34 after absorbing heat from the exhaust gas. The heat medium heats the discharge line 13 of the compressor 12, and is then circulated into the exhaust gas waste heat recovering heat exchanger 13.

Meanwhile, when the directional valve 22 is switched to the heating mode, and the compressor 12 is driven, the compressor 12 compresses low-temperature and low-pressure refrigerant gas, thereby changing the refrigerant gas into a high-temperature and high-pressure state. The compressed high-temperature and high-pressure refrigerant gas is heated by the compressor discharge line heater 34 while passing through the discharge line 13 of the compressor 12.

As shown in FIG. 1, the heated high-temperature and high-pressure refrigerant gas passes through the indoor heat exchanger 14 via the directional valve 22, thereby increasing indoor temperature over the case in which the refrigerant is not heated by the compressor discharge line heater 34.

The refrigerant performs heat exchange with indoor air while passing through the indoor heat exchanger 14, and is then circulated into the compressor 12 after passing through the expansion device 16, outdoor heat exchanger 18, and directional valve 22, in this order.

On the other hand, in a cooling operation of the air conditioner 20, the heat medium circulation pump 38 is stopped. In this case, the directional valve 22 is switched to a cooling mode, and the compressor 12 is driven, using the electricity generated from the generator 10.

In the stopped state of the heat medium circulation pump 38, the exhaust gas discharged from the engine 2 is discharged to the atmosphere after releasing heat into the exhaust gas waste heat recovering heat exchanger 32. In this case, the exhaust gas waste heat recovering heat exchanger 32 releases heat to the atmosphere.

When the directional valve 22 is switched to the cooling mode, and the compressor 12 is driven, the compressor 12 compresses low-temperature and low-pressure refrigerant gas, thereby changing the refrigerant gas into a high-temperature and high-pressure state. As shown in FIG. 2, the compressed high-temperature and high-pressure refrigerant gas is fed into the outdoor heat exchanger 18 via the directional valve 22, and absorbs heat from indoor air while passing through the indoor heat exchanger 14 via the expansion device 16. Thereafter, the refrigerant is circulated into the compressor via the directional valve 22.

Figure 3:
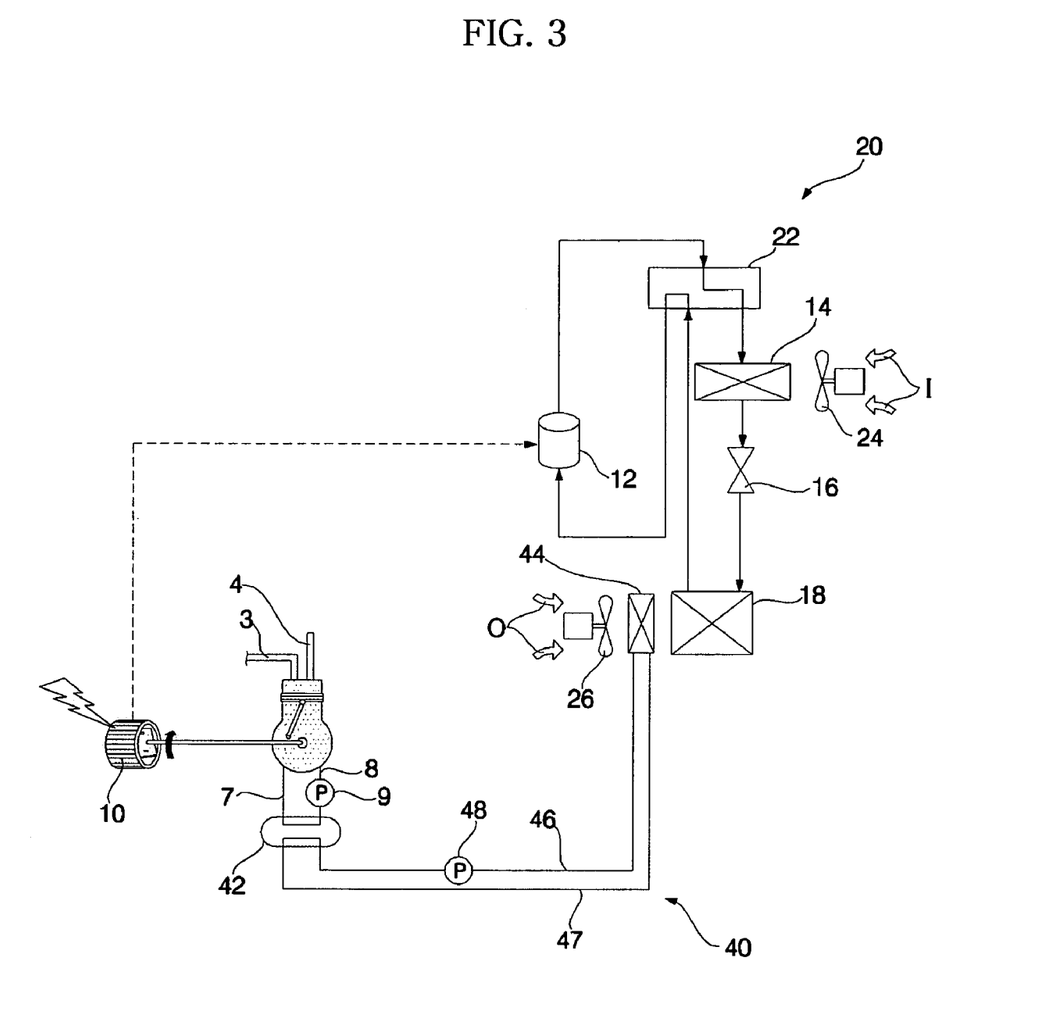
FIG. 3 is a schematic diagram of an electricity generating and air conditioning system according to a second embodiment of the present invention, illustrating a state in which the system operates in a heating mode.

FIG. 3 is a schematic diagram of an electricity generating and air conditioning system according to a second embodiment of the present invention, illustrating a state in which the system operates in a heating mode. The constituent elements of the second embodiment respectively corresponding to those of the first embodiment are designated by the same reference numerals, and no detailed description thereof will be given.

As shown in FIG. 3, the electricity generating and air conditioning system includes an engine 2, a generator 10 connected to an output shaft of the engine 2 to generate electricity, and an air conditioner 20, which uses the electricity generated from the generator 10 and includes a compressor 12, an indoor heat exchanger 14, an expansion device 16, and an outdoor heat exchanger 18. The electricity generating and air conditioning system also includes a cooling water waste heat recovering means 40 to recover heat of cooling water used to cool the engine 2 and to pre-heat air blown to the outdoor heat exchanger 18, using the recovered heat.

A cooling water waste heat recovering heat exchanger 42 is connected to the engine 2 via cooling water circulation conduits 7 and 8 so that the cooling water, which is heated while cooling the engine 2, transfers heat to the cooling water waste heat recovering heat exchanger 42 while passing through the cooling water waste heat recovering heat exchanger 42, and is then again circulated into the engine 2.

A cooling water circulation pump 9 is connected to one of the engine 2, cooling water waste heat recovering heat exchanger 42, and cooling water circulation conduits 7 and 8.

The cooling water waste heat recovering heat exchanger 42, which is included in the cooling water waste heat recovering means 40, recovers heat of the cooling water used to cool the engine 2. In addition to the cooling water waste heat recovering heat exchanger 42, the cooling water waste heat recovering means 40 includes a pre-heater 44 to pre-heat air blown to the outdoor heat exchanger 18, using the heat recovered by the cooling water waste heat recovering heat exchanger 42.

The pre-heater 44 is arranged upstream from the outdoor heat exchanger 18 with respect to a flowing direction of outdoor air O blown toward the outdoor heat exchanger 18 to heat the blown outdoor air O.

The cooling water waste heat recovering means 40 also includes heat medium circulation conduits 46 and 47, which connect the cooling water waste heat recovering heat exchanger 42 and the pre-heater 44 to guide a heat medium emerging from the cooling water waste heat recovering heat exchanger 42 such that the heat medium is circulated into the cooling water waste heat recovering heat exchanger 42 after absorbing heat from the cooling water in the cooling water waste heat recovering heat exchanger 42 and subsequently heating the pre-heater 44.

The cooling water waste heat recovering means 40 further includes a heat medium circulation pump 48 directly connected to one of the circulation conduits 46 and 47 for the circulation of the heat medium.

When the air conditioner 20 operates in a heating mode in the electricity generating and air conditioning system having the above-described arrangement according to this embodiment, the cooling water circulation pump 9 and heat medium circulation pump 48 are driven, and the directional valve 22 is switched to a heating mode. The compressor 12 is also driven, using electricity generated from the generator 10.

When the cooling water circulation pump 9 operates, the cooling water, which is heated while cooling the engine 2, is fed to the cooling water waste heat recovering heat exchanger 42 via the cooling water circulation conduit 8, and is then circulated into the engine 2 via the cooling water circulation conduit 7 after releasing its heat into the heat medium in the cooling water waste heat recovering heat exchanger 42.

Meanwhile, when the directional valve 22 is switched to the heating mode, and the compressor 12 is driven, the compressor 12 compresses low-temperature and low-pressure refrigerant gas, thereby changing the refrigerant gas into a high-temperature and high-pressure state. The compressed high-temperature and high-pressure refrigerant gas passes through the directional valve 22, indoor heat exchanger 14, expansion device 16, outdoor heat exchanger 18, and directional valve 22, in this order, and then enters the compressor 12. Thus, the refrigerant is circulated.

The outdoor air O blown to the outdoor heat exchanger 18 passes around the outdoor heat exchanger 18 after being heated by the pre-heater 44, so that the outdoor heat exchanger 18 is prevented from being frosted.

On the other hand, in a cooling operation of the air conditioner 20, the heat medium circulation pump 38 is stopped, whereas the cooling water circulation pump 9 is driven. In this case, the directional valve 22 is switched to a cooling mode, and the compressor 12 is driven, using the electricity generated from the generator 10.

When the cooling water circulation pump 9 operates, the cooling water, which is heated while cooling the engine 2, is fed to the cooling water waste heat recovering heat exchanger 42 via the cooling water circulation conduit 8, and is then circulated into the engine 2 via the cooling water circulation conduit 7 after releasing its heat into the cooling water waste heat recovering heat exchanger 42. In this case, the cooling water waste heat recovering heat exchanger 42 releases heat to the atmosphere.

On the other hand, when the directional valve 22 is switched to the cooling mode, and the compressor 12 is driven, the compressor 12 compresses low-temperature and low-pressure refrigerant gas, thereby changing the refrigerant gas into a high-temperature and high-pressure state. The compressed high-temperature and high-pressure refrigerant gas passes through the directional valve 22, indoor heat exchanger 14, expansion device 16, outdoor heat exchanger 18, and directional valve 22, in this order, and then enters the compressor 12. Thus, the refrigerant is circulated.

Figure 4:
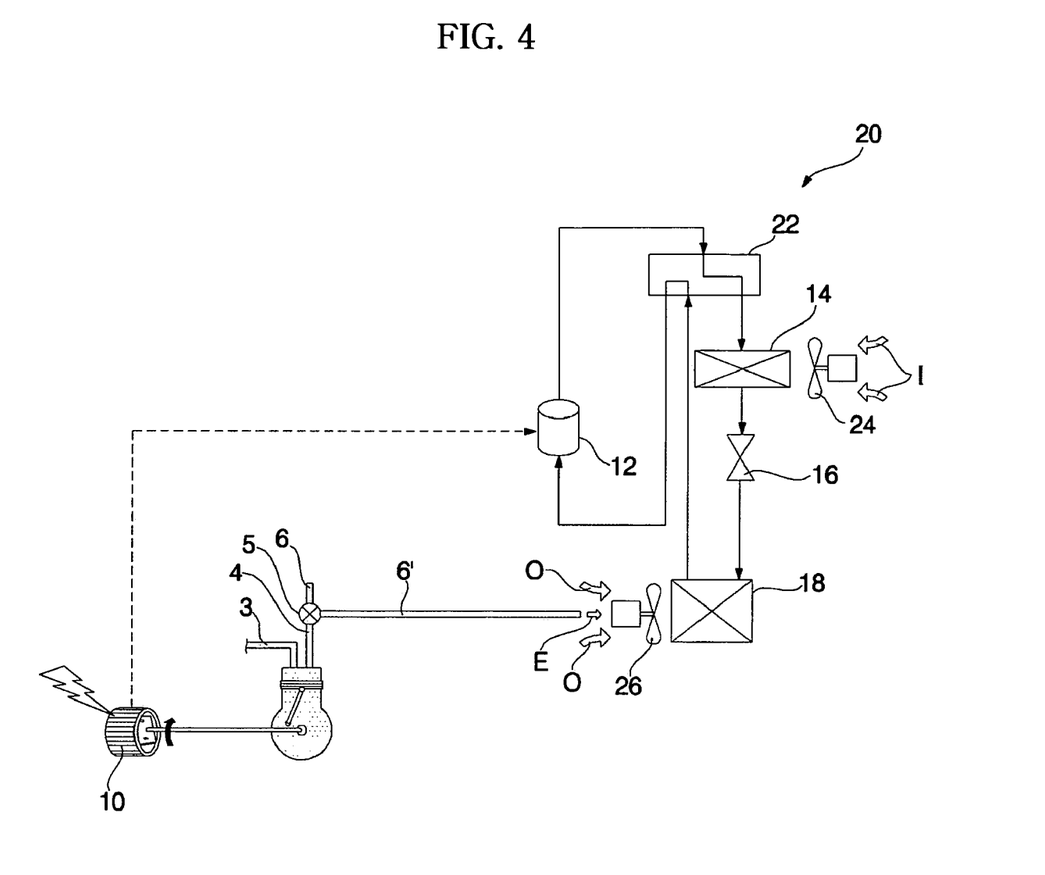
FIG. 4 is a schematic diagram of an electricity generating and air conditioning system according to a third embodiment of the present invention, illustrating a state in which the system operates in a heating mode.

FIG. 4 is a schematic diagram of an electricity generating and air conditioning system according to a third embodiment of the present invention, illustrating a state in which the system operates in a heating mode. The constituent elements of the third embodiment respectively corresponding to those of the first embodiment are designated by the same reference numerals, and no detailed description thereof will be given.

As shown in FIG. 4, the electricity generating and air conditioning system includes an engine 2, a generator 10 connected to an output shaft of the engine 2 to generate electricity, and an air conditioner 20, which uses the electricity generated from the generator 10 and includes a compressor 12, an indoor heat exchanger 14, an expansion device 16, and an outdoor heat exchanger 18. Exhaust gas E discharged from the engine 2 is fed toward the outdoor heat exchanger 18.

An exhaust gas control valve 5 is arranged in an exhaust tube 4 of the engine 2 to control a flow of exhaust gas generated from the engine 2 such that the exhaust gas is discharged to the atmosphere during a cooling operation of the air conditioner 20, and is discharged toward the outdoor heat exchanger 19 during a heating operation of the air conditioner 20.

An exhaust tube 6 is connected to the exhaust gas control valve 5 to discharge exhaust gas to the atmosphere. A recovery tube 6' is also connected to the exhaust gas control valve 5 to discharge exhaust gas toward the outdoor heat exchanger 18.

The recovery tube 6' has an inlet 6a' connected to the exhaust gas control valve 5, and an outlet 6b' arranged upstream from the outdoor heat exchanger 18 with respect to a flowing direction of exhaust gas.

When the air conditioner 20 operates in a heating mode in the electricity generating and air conditioning system having the above-described arrangement according to this embodiment, the exhaust gas control valve 5 is controlled to operate in a heating mode, and the directional valve 22 is switched to a heating mode. In this case, the compressor 12 is also driven, using electricity generated from the generator 10.

When the exhaust gas control valve 5 is controlled to operate in the heating mode, exhaust gas E generated from the engine 2 is discharged toward the outdoor heat exchanger 18 via the recovery tube 6'.

When the directional valve 22 is switched to a heating mode, and the compressor 12 is driven, the compressor 12 compresses low-temperature and low-pressure refrigerant gas, thereby changing the refrigerant gas into a high-temperature and high-pressure state. The compressed high-temperature and high-pressure refrigerant gas passes through the directional valve 22, indoor heat exchanger 14, expansion device 16, outdoor heat exchanger 18, and directional valve 22, in this order, and then enters the compressor 12. Thus, the refrigerant is circulated.

The outdoor air O blown to the outdoor heat exchanger 18 passes around the outdoor heat exchanger 18 while being heated by the exhaust gas E discharged toward the outdoor heat exchanger 18, so that the outdoor heat exchanger 18 is prevented from being frosted.

Figure 5:
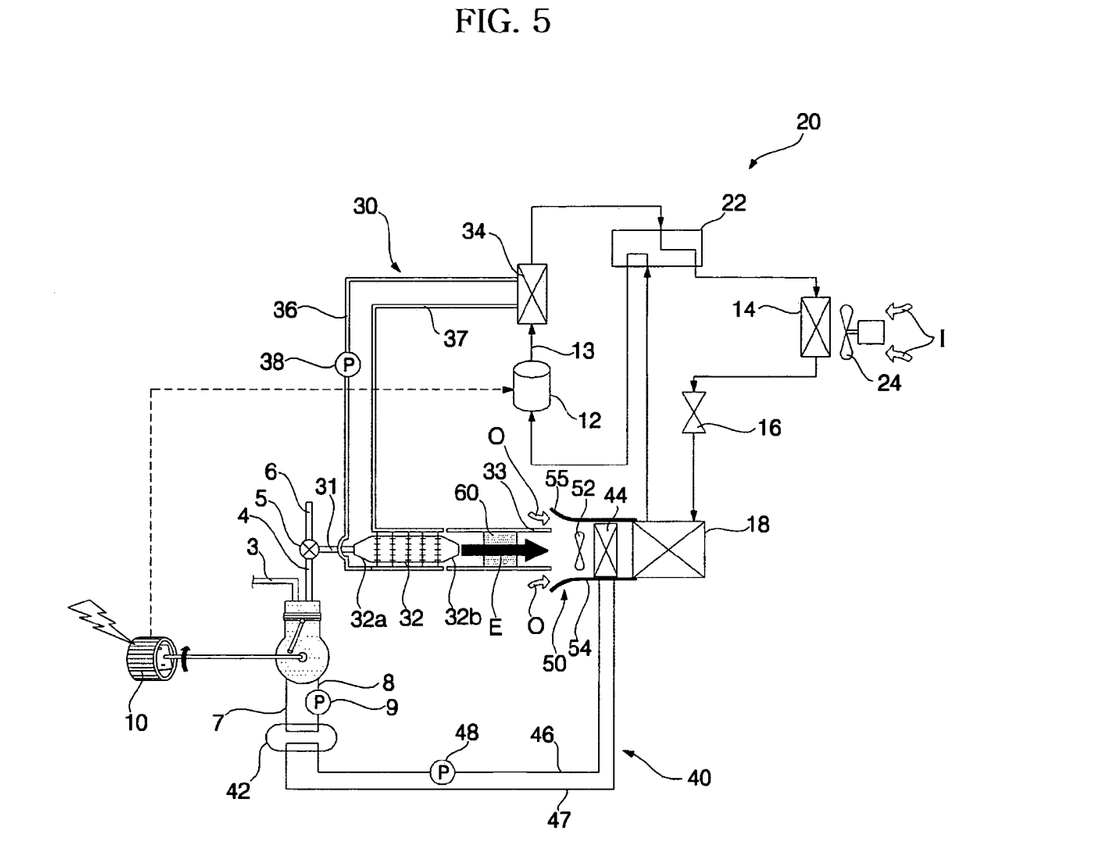
FIG. 5 is a schematic diagram of an electricity generating and air conditioning system according to a fourth embodiment of the present invention, illustrating a state in which the system operates in a heating mode.

FIG. 5 is a schematic diagram of an electricity generating and air conditioning system according to a fourth embodiment of the present invention, illustrating a state in which the system operates in a heating mode. The constituent elements of the third embodiment respectively corresponding to those of the first and second embodiments are designated by the same reference numerals, and no detailed description thereof will be given.

As shown in FIG. 5, the electricity generating and air conditioning system includes an engine 2, a generator 10 connected to an output shaft of the engine 2 to generate electricity, and an air conditioner 20, which uses the electricity generated from the generator 10 and includes a compressor 12, an indoor heat exchanger 14, an expansion device 16, and an outdoor heat exchanger 18. The electricity generating and air conditioning system also includes an exhaust gas waste heat recovering means 30, which includes an exhaust gas waste heat recovering heat exchanger 32 to recover heat of exhaust gas discharged from the engine 2, and a compressor discharge line heater 34 to heat refrigerant passing through a discharge line 13 of the compressor 12, using the heat recovered by the exhaust gas waste heat recovering heat exchanger 32, a cooling water waste heat recovering means 40, which includes a cooling water waste heat recovering heat exchanger 42 to recover heat of cooling water used to cool the engine 2, and a pre-heater 44 to pre-heat air blown to the outdoor heat exchanger 18, using the heat recovered by the cooling water waste heat recovering heat exchanger 42, and a guide means 50 to guide exhaust gas E, which has released heat into the exhaust gas waste heat recovering heat exchanger 32, to be fed to the pre-heater 44 after being mixed with outdoor air O.

An exhaust gas control valve 5 is arranged in an exhaust tube 4 of the engine 2 to control a flow of exhaust gas generated from the engine 2 such that the exhaust gas is discharged to the atmosphere during a cooling operation of the air conditioner 20, and is discharged toward the exhaust gas waste heat recovering heat exchanger 32 during a heating operation of the air conditioner 20.

An exhaust tube 6 is connected to the exhaust gas control valve 5 to discharge exhaust gas to the atmosphere. An exhaust gas guide tube 31 is also connected to the exhaust gas control valve 5 to guide exhaust gas to be fed to the exhaust gas waste heat recovering heat exchanger 32.

The exhaust gas guide tube 31 is connected to an exhaust gas inlet 32a of the exhaust gas waste heat recovering heat exchanger 32 such that exhaust gas guided by the exhaust gas guide tube 31 is introduced into the exhaust gas waste heat recovering heat exchanger 32 through the exhaust gas inlet 32a.

A guide duct 33 is connected to an outlet 32b of the exhaust gas waste heat recovering heat exchanger 32 such that exhaust gas E emerging from the exhaust gas waste heat recovering heat exchanger 32 is guided to the pre-heater 44.

The pre-heater 44 is arranged upstream from the outdoor heat exchanger 18 with respect to a flowing direction of outdoor air O blown toward the outdoor heat exchanger 18 to heat the blown outdoor air O.

The guide means 50 includes an outdoor blower 52 to blow the exhaust gas E, which has released heat to the exhaust gas waste heat recovering heat exchanger 32, and the outdoor air O to the pre-heater 44, and a guide 54 to guide the exhaust gas E, which has released heat to the exhaust gas waste heat recovering heat exchanger 32, and the outdoor air O to the pre-heater 44.

The blower 52 is arranged between the exhaust gas waste heat recovering heat exchanger 32 and the pre-heater 44.

In order to receive the outdoor air O as well as the exhaust gas E during the operation of the blower 52, the guide 54 is spaced apart from the exhaust gas waste heat recovering heat exchanger 32, in particular, the guide duct 33.

The guide 54 is defined therein with a space having a predetermined size and a predetermined length to surround both the pre-heater 44 and the blower 52.

The guide 54 has an enlarged inlet 55 to allow outdoor air O to be easily introduced into the guide 54.

The electricity generating and air conditioning system according to this embodiment further includes a purifying means 60 to purify the exhaust gas E, which has released heat to the exhaust gas waste heat recovering heat exchanger 32.

The purifying means 60 comprises a three-way catalyst converter to convert harmful substances contained in the exhaust gas E, such as carbon monoxide (CO), hydrocarbons (HC), and nitrogen oxides ($NO_x$), into harmless $CO_2$, $H_2O$, and $N_2$ through oxidation and reduction.

The purifying means 60 is arranged in the guide duct 33.

The purifying means 60 may also include a filter to filter dust contained in the exhaust gas.

When the air conditioner 20 operates in a heating mode in the electricity generating and air conditioning system having the above-described arrangement according to this embodiment, the exhaust gas control valve 5 is controlled to operate in a heating mode, and the directional valve 22 is switched to a heating mode. In this case, the cooling water circulation pump 9 and heat medium circulation pumps 38 and 48 are driven, and the compressor 12 is also driven, using electricity generated from the generator 10.

When the exhaust gas control valve 5 is controlled to operate in the heating mode, exhaust gas E generated from the engine 2 passes around the exhaust gas waste heat recovering heat exchanger 32.

The recovery of the waste heat of exhaust gas and the waste heat of cooling water according to the operations of the cooling water circulation pump 9 and heat medium circulation pumps 38 and 48 is the same as those in the first and second embodiments, so that no detailed description will be given. Also, the operation of the air conditioner according to the operation of the compressor 12 and the switching operation of the directional valve 22 to the heating mode is the same as those in the first and second embodiments, so that no detailed description will be given.

Exhaust gas E, which has primarily released heat to the exhaust gas waste heat recovering heat exchanger 32 while passing through the exhaust gas waste heat recovering heat exchanger 32, is purified by the purifying means 60 while passing through the guide duct 33, and is then fed to the pre-heater 44.

Outdoor air O, which is blown toward the outdoor heat exchanger 18, is heated by the exhaust gas E fed to the pre-heater 44 while being mixed with the exhaust gas E.

The mixture of the heated exhaust gas E and outdoor air O is re-heated while passing around the pre-heater 44, and then passes around the outdoor heat exchanger 18, so that the outdoor heat exchanger 18 is prevented from being frosted.

When the air conditioner 20 operates in a cooling mode in the electricity generating and air conditioning system according to this embodiment, the exhaust gas control valve 5 is controlled to operate in a cooling mode, and the directional valve 22 is switched to a cooling mode. In this case, the cooling water circulation pump 9 is driven, whereas the heat medium circulation pumps 38 and 48 are stopped. Also, the compressor 12 is driven, using electricity generated from the generator 10.

The operation of the air conditioner according to the operation of the compressor 12 and the switching operation of the directional valve 22 to the cooling mode is the same as those in the first and second embodiments, so that no detailed description will be given.

When the cooling water circulation pump 9 operates, the cooling water, which is heated while cooling the engine 2, is fed to the cooling water waste heat recovering heat exchanger 42 via the cooling water circulation conduit 8, and is then circulated into the engine 2 via the cooling water circulation conduit 7 after releasing its heat into the heat medium in the cooling water waste heat recovering heat exchanger 42. The cooling water waste heat recovering heat exchanger 42 releases the absorbed heat to the atmosphere.

Figure 6:
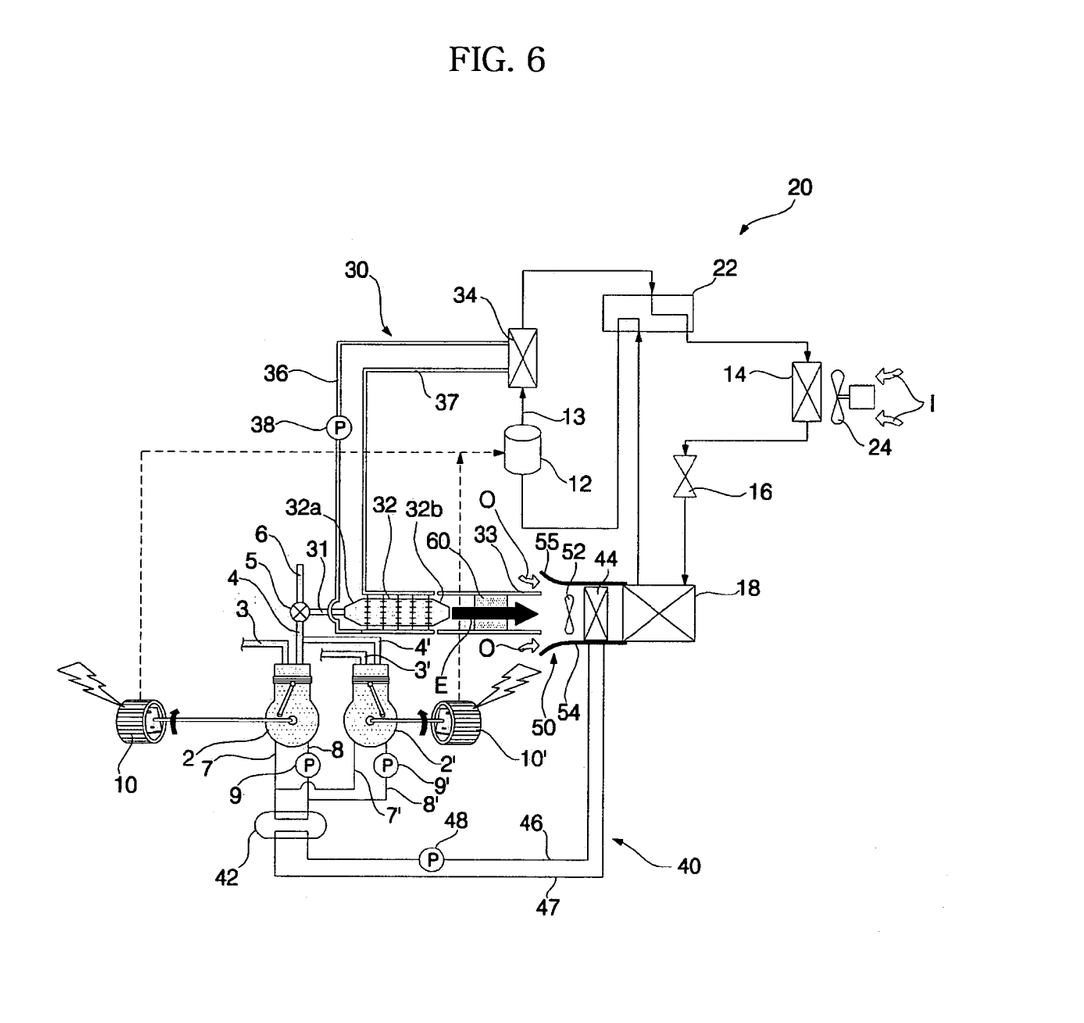
FIG. 6 is a schematic diagram of an electricity generating and air conditioning system according to a fifth embodiment of the present invention, illustrating a state in which the system operates in a heating mode.

FIG. 6 is a schematic diagram of an electricity generating and air conditioning system according to a fifth embodiment of the present invention, illustrating a state in which the system operates in a heating mode.

As shown in FIG. 6, the electricity generating and air conditioning system includes a plurality of engines 2, 2' . . . . The electricity generating and air conditioning system also includes a plurality of generators 10, 10' . . . connected to respective shafts of the engines 2, 2' . . . . The electricity generating and air conditioning system of the fifth embodiment has the same configuration and functions as those of the first through fourth embodiments, except for the engines 2, 2' . . . and generators 10, 10' . . . . Accordingly, the constituent elements of the fifth embodiment respectively corresponding to those of the first through fourth embodiments are designated by the same reference numerals, and no detailed description thereof will be given.

One or more of the engines 2, 2' . . . operate in accordance with the load to be cooled or heated.

Fuel tubes 3, 3' . . . are connected to respective engines 2, 2' . . . . Also, pairs of cooling water circulation conduits 7 and 8, 7' and 8' . . . are connected to respective engines 2, 2' . . . .

Exhaust gas tubes 4, 4' . . . are connected in parallel.

The cooling water circulation conduits 7 and 8, 7' and 8' . . . are connected in parallel.

Cooling water circulation pumps 9, 9' . . . are directly connected to the cooling water circulation conduit 7 or 8, cooling water circulation conduit 7' or 8' . . . , respectively.

Figure 7:
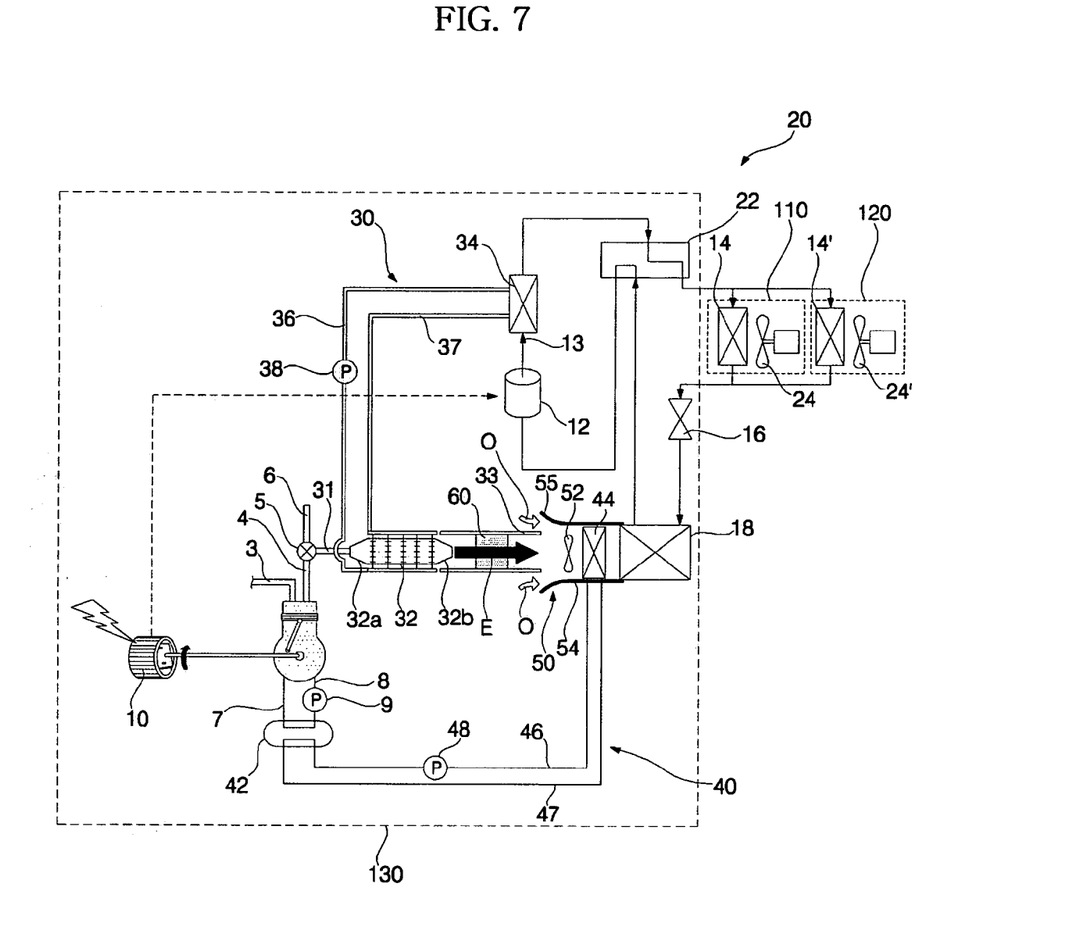
FIG. 7 is a schematic diagram of an electricity generating and air conditioning system according to a sixth embodiment of the present invention, illustrating a state in which the system operates in a heating mode.

FIG. 7 is a schematic diagram of an electricity generating and air conditioning system according to a sixth embodiment of the present invention, illustrating a state in which the system operates in a heating mode.

As shown in FIG. 7, the air conditioner, that is, the air conditioner 20, which is included in the electricity generating and air conditioning system, is of a multi-type. That is, the air conditioner 20 includes a plurality of indoor units 110, 120 . . . , and a single outdoor unit 130. The indoor units 110, 120 . . . include indoor heat exchangers 14, 14′ . . . , which are connected in parallel, respectively. The electricity generating and air conditioning system of this embodiment has the same configuration and functions as those of the first through fourth embodiments, except that the air conditioner 20 includes a plurality of indoor units 110, 120 . . . , and thus, a plurality of indoor heat exchangers 14, 14′ . . . . Accordingly, the constituent elements of the sixth embodiment respectively corresponding to those of the first through fourth embodiments are designated by the same reference numerals, and no detailed description thereof will be given.

The indoor units 110, 120 . . . also include indoor blowers 24, 24′ . . . , respectively.

Figure 8:
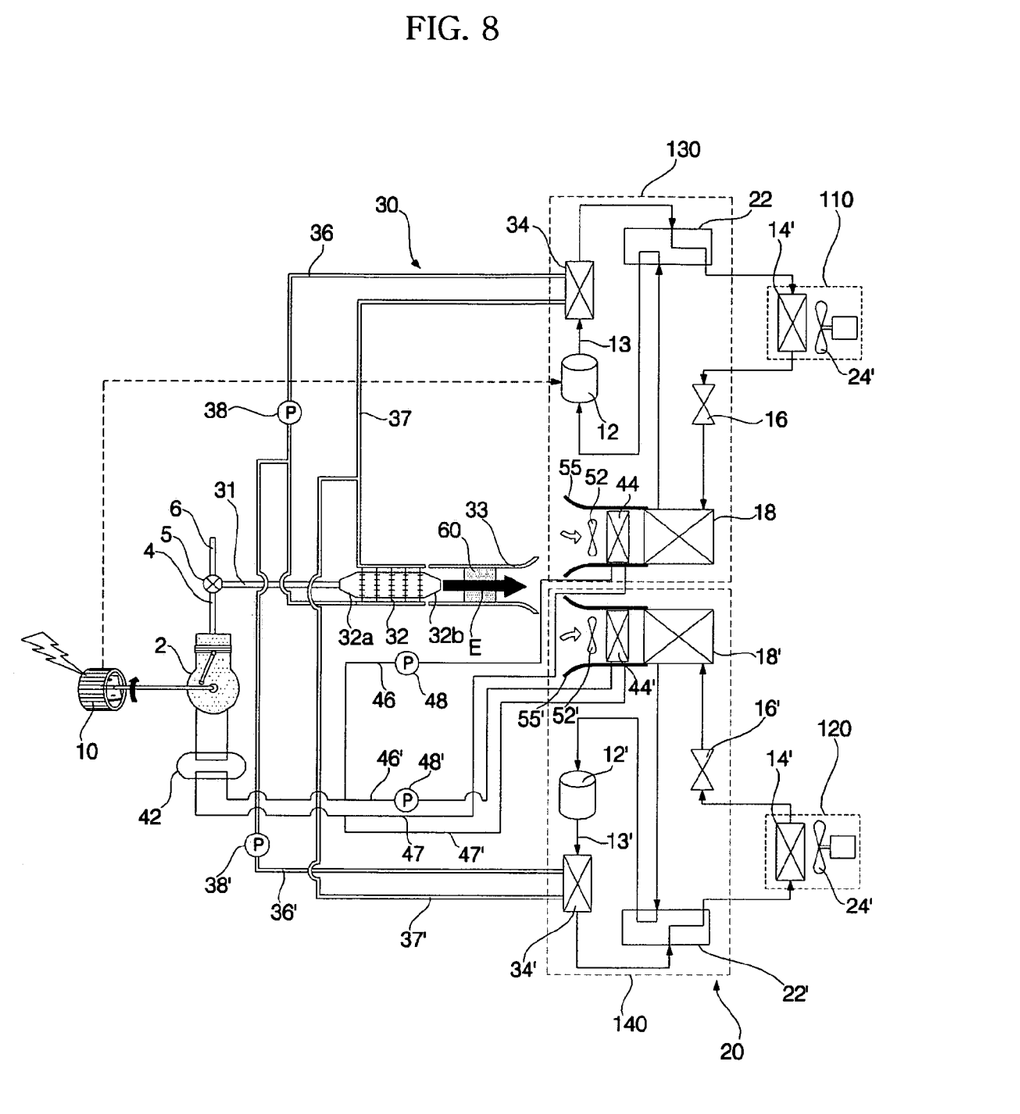
FIG. 8 is a schematic diagram of an electricity generating and air conditioning system according to a seventh embodiment of the present invention, illustrating a state in which the system operates in a heating mode.

FIG. 8 is a schematic diagram of an electricity generating and air conditioning system according to a seventh embodiment of the present invention, illustrating a state in which the system operates in a heating mode.

As shown in FIG. 8, the electricity generating and air conditioning system according to this embodiment includes an engine 2, a generator 10 connected to an output shaft of the engine 2 to generate electricity, and an air conditioner 20, which uses the electricity generated from the generator 10 and includes a plurality of indoor units 110, 120 . . . , and a plurality of outdoor units 130, 140 . . . . The electricity generating and air conditioning system also includes an exhaust gas waste heat recovering heat exchanger 32 to recover heat of exhaust gas discharged from the engine 2, and a plurality of compressor discharge line heaters 34, 34′ . . . respectively arranged in the outdoor units 130, 140 . . . to heat refrigerant passing through respective discharge lines 13, 13′ . . . of compressors 12, 12′ . . . arranged in respective outdoor units 130, 140 . . . , using the heat recovered by the exhaust gas waste heat recovering heat exchanger 32. The electricity generating and air conditioning system further includes a cooling water waste heat recovering heat exchanger 42 to recover heat of cooling water used to cool the engine 2, and a plurality of pre-heaters 44, 44′ . . . respectively arranged in the outdoor units 130, 140 . . . to pre-heat air blown to respective outdoor heat exchangers 18, 18′ . . . of the outdoor units 130, 140 . . . , using the heat recovered by the cooling water waste heat recovering heat exchanger 42. The electricity generating and air conditioning system of this embodiment has the same configuration and functions as those of the first through fourth embodiments, except for a plurality of indoor units 110, 120 . . . , and a plurality of outdoor units 130, 140 . . . . Accordingly, the constituent elements of the seventh embodiment respectively corresponding to those of the first through fourth embodiments are designated by the same reference numerals, and no detailed description thereof will be given.

The indoor units 110, 120 . . . include respective indoor heat exchangers 14, 14′ . . . , and respective indoor blowers 24, 24′ . . . .

The outdoor units 130, 140 . . . include respective compressors 12, 12′ . . . , directional valves 22, 22′ . . . , respective expansion devices 16, 16′ . . . , respective outdoor heat exchangers 18, 18′ . . . , compressor discharge line heaters 34, 34′ . . . , and respective pre-heaters 44, 44′ . . . .

In the air conditioner 20, refrigerant conduits respectively included in the indoor units 110, 120 . . . may be connected in parallel. Refrigerant conduits respectively included in the outdoor units 130. 140 . . . may also be connected in parallel. The following description will be given in conjunction with the case in which each of the outdoor units 130, 140 . . . are connected to an associated one of the indoor units 110, 120 . . . to constitute one air conditioner set, and each air conditioner set operates independently of other air conditioner sets.

Pairs of heat medium circulation conduits 36 and 37, 36′ and 37′ . . . are arranged between the exhaust gas waste heat recovering heat exchanger 32 and respective compressor discharge line heaters 34, 34′ . . . to connect the exhaust gas waste heat recovering heat exchanger 32 and respective compressor discharge line heaters 34, 34′ . . . . Heat medium circulation pumps 38, 38′ . . . are directly connected to respective pairs of heat medium circulation conduits 36 and 37, 36′ and 37′ . . . .

After absorbing heat from exhaust gas in the exhaust gas waste heat recovering heat exchanger 32, the heat medium may be distributed to all compressor discharge line heaters 34, 34′ . . . to enhance the heating performances of the indoor units 110, 120 . . . . Alternatively, the heat medium may be supplied to only the compressor discharge line heater of the currently-operating outdoor unit, for example, the compressor discharge line heater 34 of the outdoor unit 130. In this case, it is possible to concentratedly enhance the heating performances of the indoor unit 110 connected to the currently-operating outdoor unit 130.

The heat medium circulation conduits 36 and 37, 36′ and 37′ . . . are connected in parallel.

Pairs of heat medium circulation conduits 46 and 47, 46′ and 47′ . . . are arranged between the cooling water waste heat recovering heat exchanger 42 and respective pre-heaters 44, 44′ . . . to connect the cooling water waste heat recovering heat exchanger 42 and respective pre-heaters 44, 44′ . . . . Heat medium circulation pumps 48, 48′ . . . are directly connected to respective pairs of heat medium circulation conduits 46 and 47, 46′ and 47′ . . . .

The heat medium circulation conduits 46 and 47, 46′ and 47′ . . . are connected in parallel.

After absorbing heat from cooling water in the cooling water waste heat recovering heat exchanger 42, the heat medium may be distributed to all pre-heaters 44, 44′ . . . to prevent all outdoor heat exchangers 18, 18′ . . . from being frosted. Alternatively, the heat medium may be supplied to only the pre-heater of the currently-operating outdoor unit, for example, the pre-heater 44 of the outdoor unit 130. In this case, it is possible to prevent the outdoor heat exchanger 18 of the currently-operating outdoor unit 130.

A guide duct 33 is connected to the exhaust gas waste heat recovering heat exchanger 32 such that exhaust gas E emerging from the exhaust gas waste heat recovering heat exchanger 32 is guided to the pre-heaters 44, 44′ . . . .

Reference numerals 52, 52′ . . . designate outdoor blowers arranged in the outdoor units 130, 140 . . . , respectively. Reference numerals 55, 55′ . . . designate guides arranged at the outdoor units 130, 140 . . . , respectively.

Meanwhile, the present invention is not limited to the above-described embodiments. For example, the electricity generating and air conditioning system according to the present invention may include a plurality of engines, a plurality of indoor units, and a plurality of outdoor units.

Also, in accordance with the present invention, the exhaust tube 4 may be directly connected to the inlet of the exhaust gas waste heat recovering heat exchanger 32, without using the exhaust gas control valve 5, exhaust tube 6, and exhaust gas guide tube 31. In this case, during the heating operation, the heat medium circulation pump 38 absorbs heat from the exhaust gas waste heat recovering heat exchanger 32, and transfers the absorbed heat to the compressor discharge line heater 34. During the cooling operation, the exhaust gas waste heat recovering heat exchanger 32 absorbs heat from exhaust gas, and discharges the absorbed heat to the atmosphere. Various embodiments may be implemented, without departing from the scope and spirit of the invention as disclosed in the accompanying claims.

The electricity generating and air conditioning system according to any one of the above-described embodiments of the present invention has various effects.

That is, the electricity generating and air conditioning system according to the present invention has an advantage in that heat of exhaust gas discharged from the engine is recovered to be supplied to the discharge line of the compressor, and thus, to heat refrigerant passing through the compressor discharge line, so that it is possible to enhance the heating performance of the indoor unit.

The electricity generating and air conditioning system according to the present invention also has an advantage in that heat of cooling water used to cool the engine is recovered to pre-heat air blown to the outdoor heat exchanger, so that it is possible to prevent the outdoor heat exchanger from being frosted, and to achieve an enhancement in heating performance.

Also, the electricity generating and air conditioning system according to the present invention has an advantage in that exhaust gas generated from the engine is discharged toward the outdoor heat exchanger to heat air blown to the outdoor heat exchanger, so that it is possible to prevent the outdoor heat exchanger from being frosted, and to achieve an enhancement in heating performance.

In addition, the electricity generating and air conditioning system according to the present invention has an advantage in that waste heat is primarily recovered by the exhaust gas waste heat recovering heat exchanger and compressor discharge line heater, is secondarily recovered by the cooling water waste heat recovering heat exchanger and pre-heater, and is thirdly recovered as the exhaust gas, which emerges from the exhaust gas waste heat recovering heat exchanger, is guided to the pre-heater after being mixed with outdoor air, so that it is possible to achieve a high energy efficiency.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An electricity generating and air conditioning system comprising:
    an engine;
    a generator connected to an output shaft of the engine to generate electricity;
    an air conditioner, which uses the electricity generated from the generator and includes a compressor, an indoor heat exchanger, an outdoor heat exchanger, and an expansion device; and
    exhaust gas waste heat recovering means for recovering heat of exhaust gas discharged from the engine and transferring the recovered heat to a refrigerant discharged from a discharge line of the compressor before entering the indoor heat exchanger.

2. The electricity generating and air conditioning system according to claim 1, wherein the exhaust gas waste heat recovering means comprises:
    an exhaust gas waste heat recovering heat exchanger to recover the heat of the exhaust gas discharged from the engine; and
    a compressor discharge line heater to heat the refrigerant discharged from a discharge line of the compressor before entering the indoor heat exchange, using the heat recovered by the exhaust gas waste heat recovering heat exchanger.

3. The electricity generating and air conditioning system according to claim 1, wherein the exhaust gas is discharged toward the outdoor heat exchanger after releasing heat into the exhaust gas waste heat recovering means.

4. The electricity generating and air conditioning system according to claim 1, further comprising:
    cooling fluid waste heat recovering means to recover heat of cooling fluid used to cool the engine and to pre-heat air blown to the outdoor heat exchanger, using the recovered heat.

5. The electricity generating and air conditioning system according to claim 4, wherein the cooling fluid waste heat recovering means comprises:
    a cooling fluid waste heat recovering heat exchanger to recover the heat of the cooling fluid used to cool the engine; and
    a pre-heater to pre-heat the air blown to the outdoor heat exchanger, using the heat recovered by the cooling fluid waste heat recovering heat exchanger during a heating mode of the air conditioner, the cooling fluid waste heat recovering heat exchanger stopping supplying the heat of the cooling fluid to the pre-heater during a cooling mode of the air conditioner.

6. The electricity generating and air conditioning system according to claim 4, wherein the exhaust gas is discharged toward the outdoor heat exchanger after releasing heat into the exhaust gas waste heat recovering means.

7. The electricity generating and air conditioning system according to claim 1, wherein the air conditioner is a heat pump air conditioner.

8. The electricity generating and air conditioning system according to claim 1, wherein at least one of the engine, the generator, the outdoor heat exchanger, and the indoor heat exchanger comprises a plurality of ones.

9. An electricity generating and air conditioning system comprising:
    an engine;
    a generator connected to an output shaft of the engine to generate electricity;
    an air conditioner, which uses the electricity generated from the generator and includes a compressor, an indoor heat exchanger, an outdoor heat exchanger, and an expansion device;
    a cooling fluid waste heat recovering heat exchanger to recover the heat of the cooling fluid used to cool the engine; and
    a pre-heater to pre-heat air blown to the outdoor heat exchanger by using the heat recovered by the cooling fluid waste heat recovering heat exchanger during a heating mode of the air conditioner, the cooling fluid waste heat recovering heat exchanger stopping supplying the heat of the cooling fluid to the pre-heater during a cooling mode of the air conditioner.

10. The electricity generating and air conditioning system according to claim 9, wherein the exhaust gas generated from the engine is discharged toward the outdoor heat exchanger.

11. The electricity generating and air conditioning system according to claim 9, wherein the air conditioner is a heat pump air conditioner.

12. The electricity generating and air conditioning system according to claim 9, wherein at least one of the engine, the generator, the outdoor heat exchanger, and the indoor heat exchanger comprises a plurality of ones.

13. An electricity generating and air conditioning system comprising:
   an engine;
   a generator connected to an output shaft of the engine to generate electricity;
   an air conditioner, which uses the electricity generated from the generator and includes a compressor, an indoor heat exchanger, an outdoor heat exchanger, and an expansion device; and guide means to guide exhaust gas discharged from the engine to be fed toward the outdoor heat exchanger;
   wherein the guide means comprises an outdoor blower to blow the exhaust gas discharged from the engine and the outdoor air to the outdoor heat exchanger, and
   a guide to guide the exhaust gas discharged from the engine and the outdoor air toward the outdoor heat exchanger.

14. The electricity generating and air conditioning system according to claim 13, further comprising:
   purifying means to purify the exhaust gas discharged from the engine.

15. The electricity generating and air conditioning system according to claim 13, wherein the air conditioner is a heat pump air conditioner.

16. The electricity generating and air conditioning system according to claim 13, wherein at least one of the engine, the generator, the outdoor heat exchanger, and the indoor heat exchanger comprises a plurality of ones.

17. An electricity generating and air conditioning system comprising:
   an engine;
   a generator connected to an output shaft of the engine to generate electricity;
   an air conditioner, which uses the electricity generated from the generator and includes a compressor, an indoor heat exchanger, an outdoor heat exchanger, and an expansion device;
   an exhaust gas waste heat recovering heat exchanger to recover heat of exhaust gas discharged from the engine;
   a compressor discharge line heater to heat a refrigerant discharged from a discharge line of the compressor before entering the indoor heat exchanger, using the heat recovered by the exhaust gas waste heat recovering heat exchanger;
   a cooling fluid waste heat recovering heat exchanger to recover heat of cooling fluid used to cool the engine;
   a pre-heater to pre-heat air blown to the outdoor heat exchanger by using the heat recovered by the cooling fluid waste heat recovering heat exchanger during a heating mode of the air conditioner, the cooling fluid waste heat recovering heat exchanger stopping supplying the heat of the cooling fluid to the pre-heater during a cooling mode of the air conditioner; and
   guide means to guide exhaust gas, which has released heat into the exhaust gas waste heat recovering heat exchanger, to be fed to the pre-heater after being mixed with outdoor air.

18. The electricity generating and air conditioning system according to claim 17, wherein the guide means comprises a guide to guide the exhaust gas, which has released heat to the exhaust gas waste heat recovering heat exchanger, and the outdoor air to the pre-heater.

19. The electricity generating and air conditioning system according to claim 18, wherein the guide means further comprises an outdoor blower to blow the exhaust gas, which has released heat to the exhaust gas waste heat recovering heat exchanger, and the outdoor air to the pre-heater.

20. The electricity generating and air conditioning system according to claim 17, further comprising:
   purifying means to purify the exhaust gas, which has released heat to the exhaust gas waste heat recovering heat exchanger.

21. The electricity generating and air conditioning system according to claim 17, wherein the air conditioner is a heat pump air conditioner.

22. The electricity generating and air conditioning system according to claim 17, wherein at least one of the engine, the generator, the outdoor heat exchanger, and the indoor heat exchanger comprises a plurality of ones.

* * * * *